United States Patent [19]

Preineder et al.

[11] Patent Number: 4,769,839
[45] Date of Patent: Sep. 6, 1988

[54] METHOD AND DEVICE FOR THE TRANSFER OF DATA IN A DATA LOOP

[75] Inventors: Hans Preineder, Lanzenkirchen; Edwin Querasser, Vienna; Frank Buschbeck, Vienna; Manfred Lindner, Vienna, all of Austria

[73] Assignee: Ostereichisehes Forschungszentrum Seibersdorf G.m.b.H., Vienna, Austria

[21] Appl. No.: 704,317
[22] PCT Filed: May 29, 1984
[86] PCT No.: PCT/AT84/00021
 § 371 Date: Jan. 22, 1985
 § 102(e) Date: Jan. 22, 1985
[87] PCT Pub. No.: WO84/04861
 PCT Pub. Date: Dec. 6, 1984

[30] Foreign Application Priority Data

May 31, 1983 [AT] Austria .................................. 1991/83

[51] Int. Cl.[4] .............................................. H04J 3/00
[52] U.S. Cl. ......................................... 370/86; 370/89
[58] Field of Search ..................... 370/85, 86, 89, 95; 340/825.05

[56] References Cited

U.S. PATENT DOCUMENTS 3,755,786  8/1973  Dixon et al. ........................ 370/89
3,919,484  11/1975 Maxemchuk .................. 179/15 AL
3,921,137  11/1975 McClearn, Jr. et al. ............. 370/89
4,460,994  7/1984  Scanlon et al. ....................... 370/89

FOREIGN PATENT DOCUMENTS 0035789  9/1981  European Pat. Off. .
0065377  11/1982 European Pat. Off. .
2094110  9/1982  United Kingdom .

OTHER PUBLICATIONS

Article from the publication entitled "Telecommunications and Radio Engineering", vol. 36/37, Feb. 2, 1982 issue.

Article entitled "Optical Fibers Ring System of Digital Channels", by V. V. Abramov et al., pp. 110 through 112.

Article entitled "A Local Network for Experiment Support", pp. 356 through 362, by J. A. Davis et al., excerpted from the Proceedings of the National Electronics Conference, vol. 36 (1982), held in Oak Brook, Ill.

*Primary Examiner*—Douglas W. Olms
*Assistant Examiner*—Wellington Chin
*Attorney, Agent, or Firm*—Werner W. Kleeman

[57] ABSTRACT

A method and arrangement for transmitting data in a data loop comprising at least two stations and at least one of which is an overriding master station in which a transmission frame for the data to be transmitted is generated for transmission through all successive stations. Each transmission frame is generated with a predetermined constant number of clock cycles and contains exclusively the data to be transmitted from one station to one or more others and is devoid of protocol signals, especially devoid of address signals. Each transmission frame is immediately followed by the beginning of a further identical transmission frame containing the next data to be transmitted, if any. Time slots, preferably mutually equally great time slots, in the transmission frame are permanently or temporally modifiably allocated to the individual stations for information or data transfer before entering each transmission frame into the data loop. The entry of transmission frames containing data to be transmitted is only effected after sychronization of all stations. The method and arrangement are particularly well suited for process control systems.

31 Claims, 4 Drawing Sheets

METHOD AND DEVICE FOR THE TRANSFER OF DATA IN A DATA LOOP

BACKGROUND OF THE INVENTION

The present invention broadly relates to Local Area Networks and, more specifically, pertains to a new and improved method and arrangement for transmitting data in a data loop having at least two successively arranged stations.

Generally speaking, the method of the present invention is for transmitting data in a data loop having at least two successively arranged stations optionally provided with peripheral devices, at least one of which is an overriding master station, and comprises the steps of: generating in the overriding master station transmission frames for data to be transmitted; the step of generating transmission frames entailing generating transmission frames which are partitioned into time slots, preferably equally great time slots, and with a predetermined constant number of clock cycles; and this step of generating transmission frames also entailing generating transmission frames for containing successive data to be transmitted in mutually immediate succession such that the termination of each transmission frame of the transmission frames is followed by the beginning of a subsequent transmission frame of the transmission frames.

The arrangement of the present invention is for transmitting data in a data loop wherein the data loop comprises at least two stations interconnected by a data transmission medium, such as cables, transmitter devices, optical conductors, electrolytes or the like, forming a closed loop, at least one station of the at least two stations being an overriding master station, the overriding master station comprising a generator for generating transmission frames, the at least one overriding master station comprising a transmitter device for entering the transmission frames into the data loop or into the medium interconnecting the at least two stations; the data transmission medium conducting the transmission frames through all stations and back to the overriding master station; each station of the at least two stations, inclusive of the at least one overriding master station, comprising a receiver device for the transmission frames, a synchronization device and at least one input-output device or input-output device port; each station being associated with at least one peripheral device; each input-output device or input-output device port serving selectively either for transferring data being transmitted and contained in a predetermined data-receive position in each transmission frame to the peripheral device or for inputting data to be transferred from the peripheral device into a predetermined data-transmit position in each transmission frame; the data loop defining a direction of data transmission; and each station comprising a transmitter unit arranged subsequent to the input-output device or input-output device port in the direction of data transmission for transferring or entering transmission frames into the data transmission medium, possibly with the data to be transmitted in altered form.

Data networks normally have the form of "point to point" connections between nodes or points of intersection or, alternatively, the form of several stations, only one of which is permitted to transmit at one time, are simultaneously connected to one common data transmission medium (cable, radio.) Information is normally serialized and transferred or transmitted in blocks or packets. Communication between stations is always regulated by a network-specific protocol or set of procedural rules. Such protocols are, for instance, X.25 of the CCITT, Ethernet, ISO-P 802 and the like.

With the exception of time-segmented or multiplexed connections or circuits, the transmission of data requires the control of network access or priority arbitration, which calls for a certain expenditure of time and is done on the basis of addresses and arbitration priority codes contained in the transmission framing. This, for instance, is also the case in the German Patent Publication No. 2,612,311 which describes a comparable device.

Each transfer unit or each transmission frame (information block or data packet) requires a synchronization operation whose time overhead is fully integrated into the transmission time.

All protocols transmitted contain parity-checking or redundancy-checking mechanism (for instance Cyclic Redundancy Checking or LRC, VRC) for detecting transmission errors. Upon detection of transmission errors, information blocks are repeated.

Due to fluctuating network loads and consequently different arbitration rates as well as to possible repetitions for correcting transmission errors, unpredictable transmission delays are caused in all known Local Area Networks. As a consequence, these Local Area Networks or LAN's cannot be used in time-critical real time applications and control loops or circuits.

The development or evolution of data processing installations into locally distributed systems with central data banks and the necessity to communicate with distant peripheral equipment even some years ago gave rise to nearly hopeless cabling problems. The often required flexibility could not satisfactorily be assured by the technique of individual cabling.

Based on the typical structure and distribution of data processing units, the following requirements are imposed on a data network:

(a) standard interfaces (e.g. V24 asynchronous) are to be provided on the equipment interconnections;

(b) each physical connection in the data network is to be connectable to any other connection with a minimum of manipulation. The high flexibility and easy configurability required for this are to be achieved by implementation of permanent or dedicated lines, on the one hand, while the implementation of temporary connections without interruption of network operation should be possible, on the other hand.

Control of the connection circuit or routine should be possible either by means of a central routing processor or by intelligent equipment interfaces or manually from each station (routing units).

(c) Many available data or communication channels of medium data rate as well as high speed data or communication channels should be implementable at freely selectable data rates on the equipment interfaces.

(d) Protocol transparency is desirable, which means that each end to end log should be implementable in the data loop, the data loop should behave like a physical connection (no store and forward operation) and moreover, the system should be absolutely insensitive to transmission control characters.

(e) High reliability and low residual error rate by use of an optical medium (galvanic decoupling between the individual loop stations), error detection, error localization and diagnosis up to the equipment interface as well as central documentation of all errors and operational failures should be possible.

SUMMARY OF THE INVENTION

Therefore, with the foregoing in mind, it is a primary object of the present invention to provide a new and improved method and apparatus for transmitting data in a data loop which does not exhibit the aforementioned drawbacks and shortcomings of the prior art constructions.

Another and more specific object of the present invention aims at providing a new and improved method and arrangement of the previously mentioned type for transmitting data in a data loop in which re-synchronization at each transmission is omitted and there is only a synchronization check.

Yet a further significant object of the present invention aims at providing a new and improved arrangement of the character described which is relatively simple in construction and design, extremely economical to manufacture, highly reliable in operation, not readily subject to breakdown or malfunction and requires a minimum of maintenance and servicing.

Now in order to implement these and still further objects of the invention which will become more readily apparent as the description proceeds, the method of the present invention is manifested by the features that: the step of generating transmission frame entails generating transmission frames which exclusively contain data to be transmitted from a first station of the two successively arranged stations to at least one further station of the two successively arranged stations and which are devoid of protocol signals, in particular devoid of address signals, selectively permanently or temporally modifiably allocating each time slot of the time slots into which the transmission frames are partitioned to at least one predetermined station of the two successively arranged stations for data transfer, synchronizing all stations of the at least two successively arranged stations to one another; subsequently entering the transmission frames into the data loop in immediate succession; and transmitting the transmission frames through all stations successively.

The arrangement of the present invention is manifested by the features that: the generator is constructed to generate the transmission frame in immediate succession with a predetermined constant number of clock cycles and devoid of protocol signals, in particular devoid of address signals; the transitter unit being arranged and constructed to enter the transmission frames into the data transmission medium in immediate succession; a respective routing unit being associated with each input-output device or input-output device port; the transmission frames comprising predetermined time slots; the routing unit serving for allocating at least one of the predetermined time slots to each station of the at least two stations inclusive of the overriding master station, for transferring the data to be transmitted; the overriding master station comprising a synchronization identifier detection device for detecting the synchronization of all stations of the at least two stations; and the synchronization identifier detection device also serving for initiating entry of data transmission frames of said transmission frames which contain data to be transmitted into the data transmission medium.

An advantage of the present invention is that real time transfer of signals is possible because the transmission frame is continuously repeated and passed on. All codes which transmit timing or clock signals and data simultaneously can be used; there are no arbitration problems and transmission times are short and constant. Overhead caused by the normally necessary transmission of sender and receiver or talker and listener addresses in addition to the information or data to be transmitted is eliminated.

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogus components and wherein.

DETAILED DESCRIPTION OF THE PREFERRED EMBODIMENTS

Figure 1:
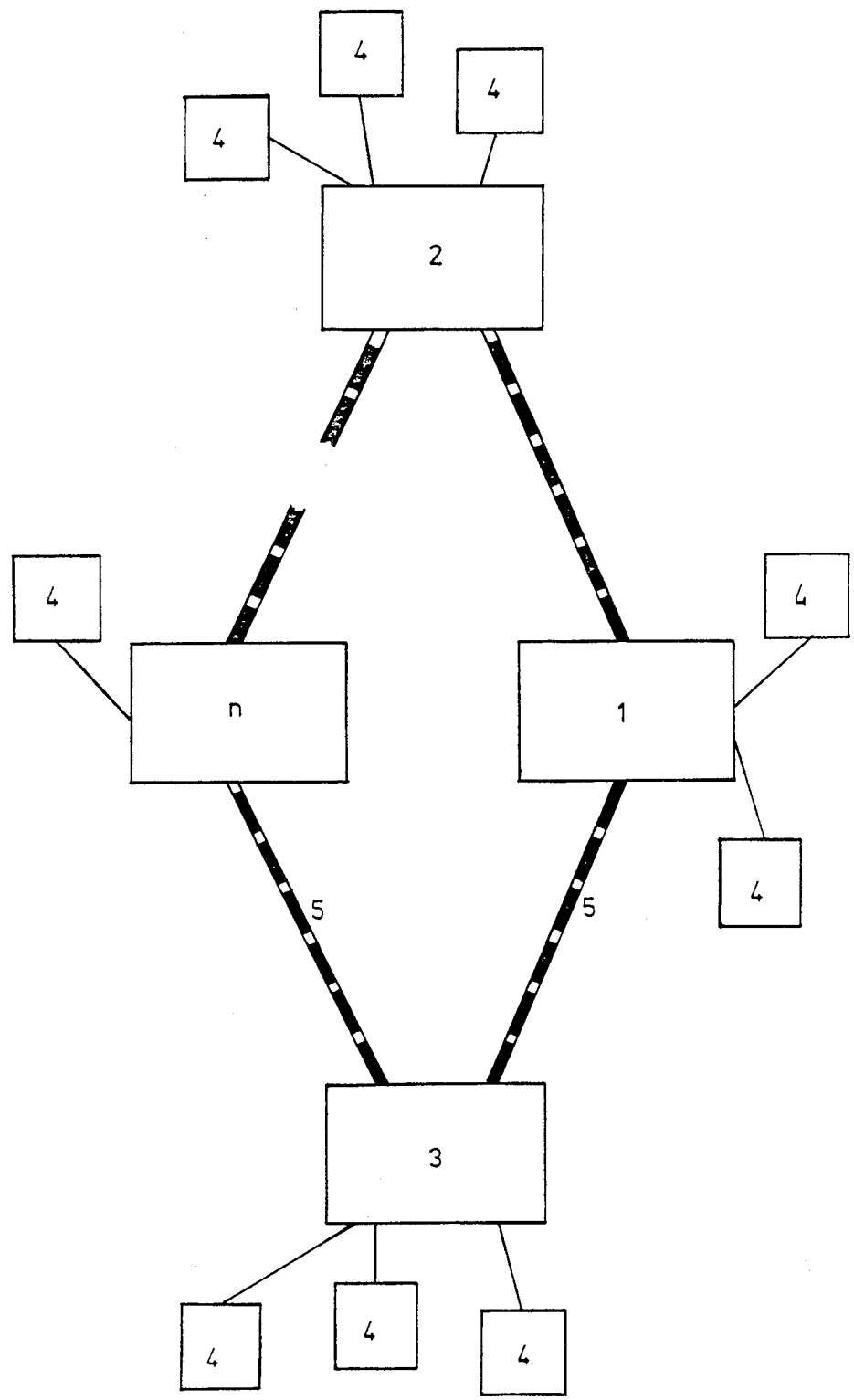
FIG. 1 shows a basic arrangement for information tranfer in a data loop with a master station and a number of secondary stations.

Describing now the drawings, it is to be understood that to simplify the showing thereof, only enough of the structure of the arrangement for transmitting data in a data loop has been illustrated therein as is needed to enable one skilled in the art to readily understand the underlying principles and concepts of this invention. Turning now specifically to FIG. 1 of the drawings, the arrangement illustrated therein by way of example and not limitation and employed to realize the method as hereinbefore described will be seen to comprise stations 1,2 . . . n forming a data loop 100 in which information is transmitted between individual station 1,2 . . . n and an overriding or continuous master station 3 via a transmission medium 5. At least one master station 3 and one further station 1,2 . . . n are necessary for forming the data loop 100. The number of stations 1,2 . . . n, of which at least one must be a master station 3, is not limited. The master station 3 initializes the data loop 100, monitors data transfer and can, if not otherwise provided for, control data transfer between the individual stations 1,2 . . . n and between itself and the stations 1,2 . . . n. Each of the stations 1,2 . . . n can receive data to be transferred via port modules (I/O ports 19 from peripheral devices 4 of any given form (processors, auxiliary devices, controllers and the like) and can transmit to any given other peripheral device 4 at the same or any other station 1,2 . . . n. The data or information is input by the device 4 to the station 1,2 . . . n, the station 1,2 . . . n transmits it via the data loop, i.e., the medium 5 interconnecting the stations 1,2 . . . n (cable, optical conductor, transmitter devices, electrolyte or the like) to other stations 1,2 . . . n or to itself or to other devices 4 connected to it; the information is output by the appropriate associated devices 4 of the receiving stations 1,2 . . . n. The allocation of the mutually communicating devices 4 can be fixedly predetermined (by means of hardware) or temporarily established (for instance by appropriate instruction input or routing units). However, allocation is always determined prior to data transmission, so that the transmission frame does not have to contain any addresses or protocol signals. Compared to other configurations (such as, for instance, star configurations), the loop structure yields the shortest cabling lengths for station linkage. A further advantage of the loop structure resides in the easy expandability of the configuration by the insertion of further stations.

Figure 2:
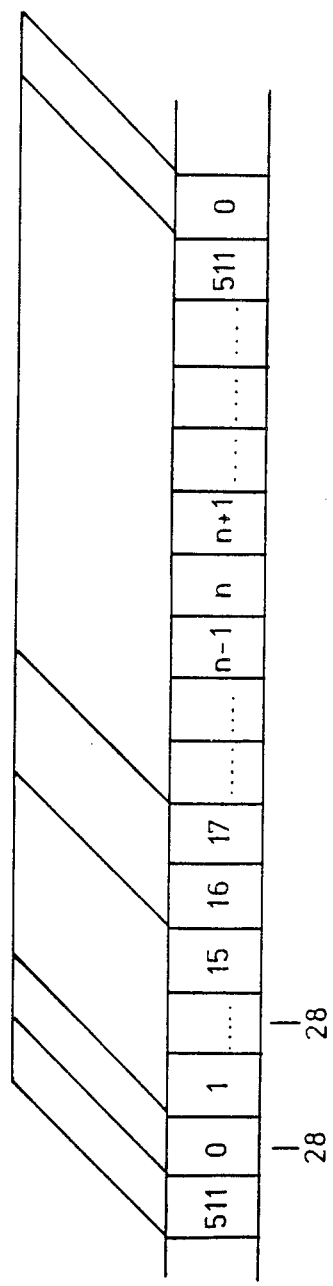
FIG. 2 shows a transmission frame.

FIG. 2 shows the format of a transmission frame or information block transmitted between the stations 1,2 . . . n in the data loop. The frame, which may be of any given length, in the instant case shows 512 time slots or sectors 28 of identical length which are consecutively numbered from 0 to 511. In the instant, exemplary case, the first time slot 28 with the number 0 shows a transmission frame with an imprinted or imposed signal consisting of a number of bits or check bits which make transmission errors detectable due to their particular configuration. The check bits are arranged in such a manner that an advance or lagging of the signal in comparison to an identical sample available in the stations can be determined, in particular an advance or retard of up to two cycles, i.e. a signal shift can be detected as cycle-shifted by comparison with the sample in a flag detector. A number of further bits (status bits), or the same bits with changed signal content, in this exemplary case also arranged in the time slot 28 No. 0, is used for transmitting information for identifying the status of the data loop or for establishing or transmitting certain functions in the data loop, such as, for instance, a synchronization of the data loop a transfer of the data transfer or Read/Write signal and data enable pulse release from or in time slots 28 of the transmission frame carrying data or information. Depending upon the type of signal and the status bits, employment will be made in the following of the terms synchronization identifier, transfer flag identifier and error identifier. These identifiers or "MARKS" do not have to be positioned at the beginning of the transmission frame and can be longer than one time slot 28. Data imprinted in any freely selectable spot or position within the frame can give the signal "loop complete" or "data enable" and can, in conjunction with further data constitute an identifier. It is of advantage, however, to impress or impose such identifiers at the beginning of the transmission frame.

The information is transmitted in the data loop in a time multiplex process or procedure with fixed frame format. The data rate in an optical conductor, for instance, is 6144 Mbits/s. The transmission frame shown in FIG. 2, for instance, consists of 512 time slots 28 of a width of e.g. 10 bits each, with the maximum transmission time for a 10-bit-word approximately corresponding to the circulation time of a frame through the data loop and back to the transmitting station (about 1 ms). The transmission frames are transmitted without interruption, which means that the 511th time slot 28 of the last transmission frame input into the loop is immediately followed by the zeroth time 28 of the following identically formatted frame.

A bi-phase code is preferred for coding the transmission frame data. This simplifies recovery of the bit timing or clock and improves error control. It is noted that at the start of operation, or after error detection, a pure synchronization transmission frame simply containing the synchronization identifier without any further user information or data is transmitted.

Of the 512 time slots 28 contained in the transmission frame, eighteen are used in the instant exemplary embodiment for control and monitoring of the loop, i.e. for handshaking. A time slot 28 contains the synchronization identifier or mark for initial loop synchronization or the transmission flag for enabling the loop for data input or output and the simultaneous synchronization check. Two time slots 28 are used for hardware signals and 15 fifteen time slots 28 are used for loop administration and connection and disconnection between the stations 1,2 . . . mn, but not for allocation of the data contained in the same transmission frame to specific stations 1,2 . . . n or devices 4.

Due to the structure of the data loop, each one of the remaining time slots 28 of the transmission frame is suitable for servicing a bidirectional and full duplex channel due to the structure of the loop with a maximum data rate of 9600 bits/s.

It is noted that the transmission frame as such can be of nearly any desired length and that it can be subdivided into integral numbers of time slots 28 of any desired size, i.e. duration. Unused time slots 28 can be kept in reserve for larger volumes of data traffic.

Figure 3:
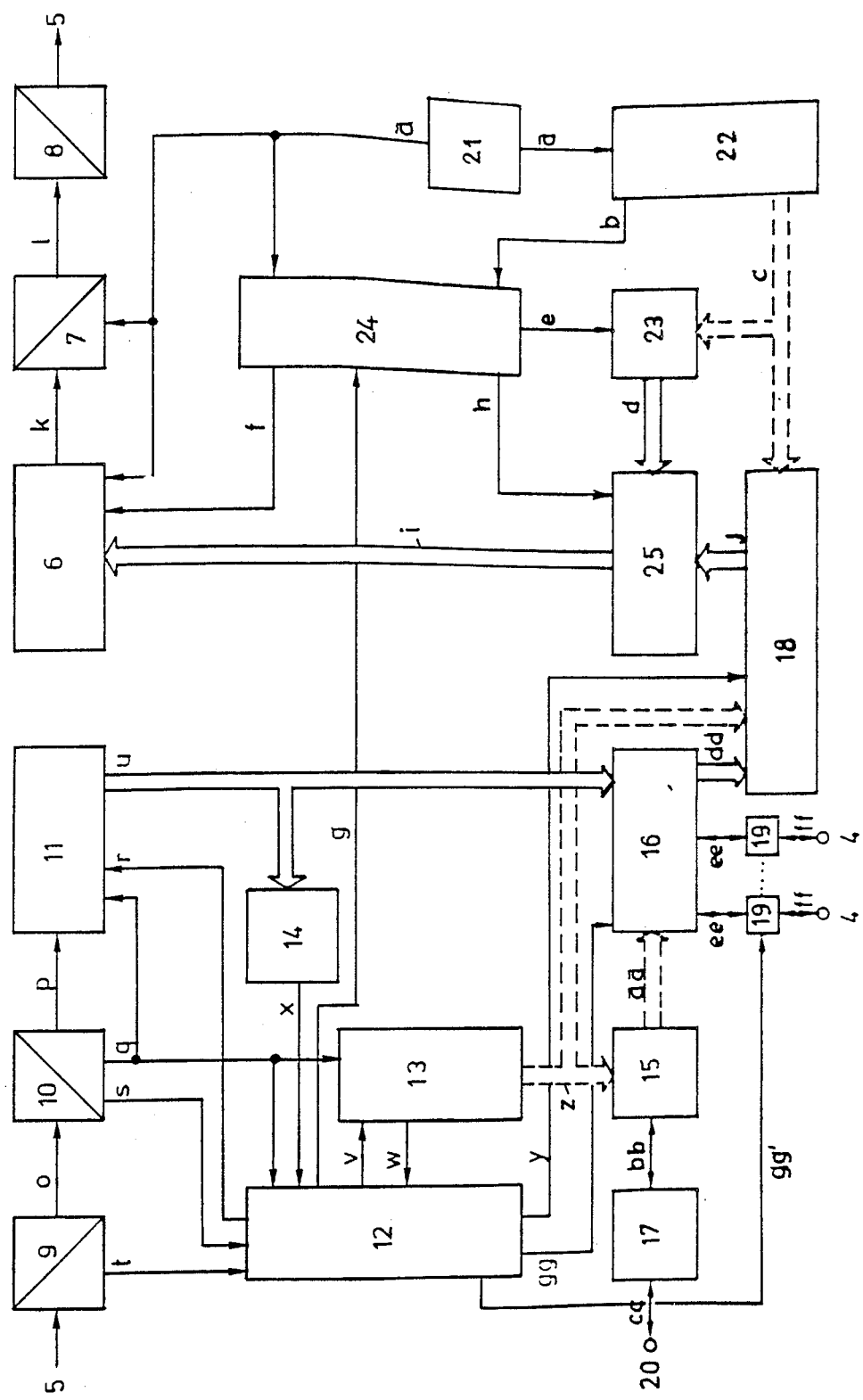
FIG. 3 shows a basic circuit diagram of a master station.

As shown in FIG. 3, the master station 3 is provided with a permanently running clock generator 21 which supplies all the timing signals required for the system and feeds these via a conductor a to a frame format counter 22, a central control unit 24, to a data shaft register unit 6 and to an encoder 7. The frame format counter 22 connected to the clock generator 21 subdivides or partitions a predetermined transmission frame (FIG. 2) into individual time slots 28 containing individual data bits and determines the time of the output or generation of a synchronization identifier or of a transmission flag in one or more time slots 28 in the central control unit 24 via a conductor b. The current time slot number at transmission of the frame appears at an output c of the frame format counter 22 and is fed to a flag generator 23 as well as to a time delay memory or intermediate buffer memory 18.

The flag generator 23, at appropriate times predetermined by the central control unit 24 via a conductor e, supplies at an output d the synchronization identifier or mark or the transmission flag, or alternatively, an error identifier or mark depending on the momentary status of the data loop, preferably at the beginning of transmission of the frame or at the cycle time for the zeroth time slot 28; this information is transmitted to a port control logic unit 25 connected to the central control unit 24 and the buffer memory 18. At start of transmission operation, the synchronization identifier is transmitted by the flag generator 23.

The central control unit 24 controls data transfer in the port control logic unit 25 via an output h and operations in the data shift register unit 6 via a conductor or line f as a function of the operational status of the data loop, which information arrives via a conductor g from an error and control logic unit 12. The status bit(s) in the identifier is (are) modified or set, or the synchronization identifier is transformed into a transmission flag (data transmission enable), via a conductor e.

The master I/O port control logic unit 25, as a function of signals received via a conductor h, presents the signals arriving via a conductor j of the time delay memory or buffer memory 18 or the data of the flag generator 23 arriving via a conductor d to the data shaft register unit 6 as output data via a conductor i.

The data received in the data shift register unit 6 in parallel form via a conductor i are transformed into serial information or data with the aid of a control signal received from the central control unit 24 via the conductor f and the cycle or clock signal received from the clock generator 21 via the conductor a and transmitted to the encoder 7 via k a conductor.

The encoder 7 combines the data information arriving via k the conductor and the cycle or clock signal arriving via a to the conductor a self-clocking clock-data signal which is transmitted via a conductor 1 to a transmitter device or transmission register 8 in which the coded clock-data-signal is brought into a form suitable for the data transmission medium 5, for instance an optical conductor, e.g. as light pulses.

Via the data transmission medium 5, the generated transmission frame is consecutively transmitted to the successive stations 1,2 . . . n and returns to the overriding master station 3 which is provided with a medium interface or receiver device 9 for incoming transmission frames. The signal coming from the data transmission medium 5 is transformed into an electronic clock-data signal the in the self-clocking code and is transmitted via a conductor o to a decoder 10. Missing frames, missing synchronization identifiers or missing transmission flags which are otherwise expected are reported to the error and control logic unit 12 via a conductor t.

In the decoder 10, the received clock-data signal is separated into a clock signal and data signals. The clock signal is transmitted via q a conductor to a frame format counter 13, the error and control unit 12 and a shift register 11. The data signals are transmitted to the shift register 11 via a conductor p. Absence of the clock-data-signal is reported to the error and control logic unit 12.

The serially received data information is controlled via the conductor p by the clock signal transmitted via the conductor q and the control signal transmitted by the error and control logic unit 12 via a conductor r to enter the shift register 11 and be presented at the buss u as received data in parallel form.

The output of the shift register 11 to the buss u is connected to a transmission flag detector 14 and the I/O controller or input-output device 16.

The transmission flag detector 14 checks, by comparison with predetermined patterns, the data present at the output to the buss u for the appearance of the bit pattern of a synchronization identifier or transmission flag or error identifier and reports, via a flag status line or conductor y, the appearance of such a sequence of characters and the therein encoded loop status to the error and control logic unit 12. The status indicates whether the data loop has been interrupted (error identifier or mark) or a synchronous data transport has taken place (transmission flag) or the loop has been synchronized (synchronization identifier or mark).

The error and control logic unit 12 distinguishes between three operational cases:

Operational case (a): data loop not synchronized; The error and control logic unit 12 monitors, at the start transmission of operation or after a data loop interruption, the status signal at the conductor x in order to determine whether a valid synchronization identifier has been detected. If a valid synchronization identifier is detected (by comparison), a reset signal is generated and transmitted via the conductor v to the frame format counter 13. The frame format counter 13 is then synchronized to the cycle of the frame received and also checks the appropriate arrival timing of further identifiers or loop status signals and in each case reports via the conductor w to the error and control logic unit 12 corresponding information as to the clock timing of an expected loop status signal. If, however, the loop status signal reports that the data loop has been interrupted, operational case (c) applies. Otherwise, the status signal "loop complete" is generated in the error and control logic unit 12 and transmitted to the central control unit 24 and operational case (b) applies.

Operational case (b): Data loop reported as complete according to synchronization identifier (start of data transmission in the loop).

The error and control logic unit 12 checks if the transmission flag always arrives at the expected time. For this purpose, the output conductor w of the frame format counter 13 checking the frame clock signal is polled. As long as the status signal at the conductor x indicates that the ring is in synchronism and no other error report (t, s) is made to the error and control logic unit 12, an enable signal via the conductor gg permits data transfer through the I/O controller on input-output device 16 and data transfer from the port modules or I/O ports 19 to the peripheral devices 4.

On occurrence of an error (no reception, missing clock signal, no transmission flag at the expected time), data transfer via the conductor gg is interrupted and operational case (a) applies.

Operational case (c): Loop interrupted.

A check is made via the conductor w to determine whether a transmission flag arrives at the expected time.

As long as the status signal present at the conductor x indicates "loop interrupted", operational case (c) applies.

On the occurrence in the station itself of one of the errors mentioned, operational case (a) applies.

A status signal loop complete at the conductor x makes operational case (b) applicable.

The error and control logic unit 12 controls data transmission or transfer into the buffer memory 18.

The frame format counter 13 connected to the error and control logic unit 12 and to a routing unit 15 supplies information at data output conductor z concerning the number or position of the actually incoming or arriving time slots 28.

The routing unit 15 contains and administers the information as to who may exchange data with whom and on which slot of the transmission frame and, at the appropriate time derived from the frame format counter 13 via the conductor z, supplies the I/O controller or input-output device 16 with this information via a conductor aa and enables inhibits or data input to or extraction from the current slot.

Information from the routing unit 15 to the I/O controller or input-output device 16 of the stations 1,2 . . . n or master station 3 is either transmitted via separate control lines or is input into the transmission frame as data to be transmitted. Inputting, however, is effected in such a way that data input into a transmission frame for controlling data extraction are valid at the earliest for data transferred in the following transmission frame. The I/O controller or input-output device 16 controls data transmission to an input-output port module or I/O port 19 and to the peripheral devices 4 as a function of the address information transmitted on a buss aa of the routing unit 15 and the enable signal transmitted on the conductor gg of the error and control logic unit 12.

After possible modification by the interface or port modules or I/O ports 19, the data are presented to the buffer memory 18 via a buss dd.

The buffer memory 18 forms a data buffer. Since the transmission time of the frame(s) in the data loop is always shorter than the duration of inputting the frame(s) into the data loop, these time lags or delays must be compensated for, and the buffer memory 18 serves this purpose. The duration of the frame(s) to be transmitted must be greater than or at least as great as the transmission time in the data loop, since an immediate succession of the frames is otherwise not possible.

The I/O ports or port modules 19 transform the data format presented at the conductors ee by the I/O controller or input-output device 16 into a format which is intelligible to the peripheral equipment or devices 4 connected via the conductors ff and then transmit the data to the peripheral devices 4 in case of the signal on the conductor gg being valid or active. It is also possible to defer or delay data output from the station 1,2 ... n or from the port modules or I/O ports 19 to the peripheral devices 4 until an enable signal is received via the conductor gg or a conductor o from the error and control logic unit 12 which generates this signal after it has checked and found free of error a transmission flag following the transmission frame from which the information was taken. It is thus possible to block or inhibit the I/O controller or input-output device 16 or 26 or to defer or delay signal transmission to the port modules or I/O ports 19.

An optionally provided routing control unit 17 can modify allocation tables contained in the routing unit 15 as to allocation of the time slots 28 in the frame to two or more peripheral devices 4 and thus form temporary connections (not predetermined by hardware) which can if desired be determined by an input unit 20 via a conductor cc.

At initiation of data transmission or when switching on the system or at termination of data transmission, the data loop is interrupted and no signal is received at the medium interface or receiver device 9. This absence is reported to the error and control logic unit 12 via the conductor t. At the same time, the clock generator 21 is running. This starts the following operation:

1. The clock generator 21 starts to generate a synchronization frame containing a certain number of clock cycles. The flag generator 23, at a time defined on the conductor b by a signal of the frame format counter 22, generates a synchronization identifier which is impressed on this synchronization frame. This synchronization identifier is followed by blank time slots 28 or by time slots 28 not carrying data; after the last time slot 28 of the frame, a newly generated, identical transmission frame is either provided with the same synchronization identifier or with a transmission flag (if the data loop is detected as complete as a result of the return of a synchronization identifier sent out from the master station) and so on.

The input-output port control logic unit 25 transfers this frame information into the data shift register unit 6. The individual frame data are then combined or merged in the encoder 7 with the clock signal arriving via the conductor a from the clock generator 21 and fed into the data transmission medium 5 via the medium interface or transmitter device or transmission register 8.

2. This synchronization transmission frame devoid of information or data runs through the data loop and then back at the medium interface or receiver device 9. As soon as the medium interface or receiver device 9 detects pure clock data on the data transmission medium 5, the error and control logic unit 12 starts the search for a synchronization identifier. Further, the clock signal is separated out at q the conductor and the data at the conductor p and the data are input into the data extraction unit or shift register 11.

3. At the same time, the loop is reported complete via the conductor g and the signal on the conductor gg "enable data transfer" is generated.

The transmission flag detector 14 further reports any detected synchronization identifier via the conductor x to the error and control logic unit 12.

4. The error and control logic unit 12 resets the frame format counter 13, in correspondence with a time predetermined by the synchronization identifier, to zero or initial status. From this time on, the frame format counter 13 transfers the identifier data or of the time slot 28 positioned at the output conductor u of the data extraction unit or shift register 11 via the slot-data buss z to the routing unit 15 or to the buffer memory 18.

5. At a predetermined reference time, the frame format counter 13 gives the signal "flag expected" at the conductor w. If no synchronization identifier appears at the conductor x at this time or no synchronization identifier is reported as detected, the operation starts over again with operation No. 3, as there must be an error. If an identifier appears at the right time, but is an error identifier operation No. 4. is repeated. If a correct synchronization identifier is received or no error identifier is determined, the central control unit 24 is informed via the conductor g that the loop is complete and in synchronism and data transfer is enabled as described below under operation No. 7.

6. When the central control unit 24 detects the status signal "loop complete" via the conductor g, it transmits via the conductor e in the time slot 28 with the identifiers the identifier "transmission flag" or the status signal "enable data transfer" according to operation No. 9.

7. If data transmission in the master station 3 is required internally to an interface or port module or I/O port 19 or to a station 1,2 ... n and one or more time slots 28 of the transmission frame are allocated by the routing control unit 17 for this transmission, and if a synchronization identifier was detected in the transmission flag detector 14 and this was signalled via the conductor to the I/O controller or input-output device 16, then the I/O central control unit 24 can initiate a data transfer, i.e. the data present at the buss u in the data extraction unit or shift register 11 are routed via the conductors ee to I/O ports or port modules 19 and/or from I/O ports or port modules 19 and/or data coming from I/O ports or port modules 19 are received, that is entered into the transmission frame.

8. The data coming from the buss u—possibly modified by operation No. 7, but otherwise unmodified—are stored in the buffer memory 13 and, controlled by the central control unit 24, are transmitted at an appropriate time via the port control logic unit 25 to the data transmitter device or transmission register unit 8 for inputting into the data transmission medium 5.

9. After detection of the status signal "loop complete" in the synchronization identifier, the flag generator 23 impresses in the next transmission frame a changed or modifier status signal in the time slot 28 containing the identifiers. This time slot 28 then forms or generates the transmission flag which enables data transfer when received in the stations 1,2 ... n or after return to the master station 3. Frames containing "loop complete" status signals or transmission flags are transferred into the medium 5 until an error is detected or an error identifier is received. When a transmission flag with "loop synchronized" status has been transferred into or transmitted through the medium 5 and, the port received again control logic unit 25 takes over the data stored in the buffer memory 18 and transfers them to the data shift register unit 6 in the correct slot 28 or slot by slot. This means that the loop and its stations 1,2 . . . n, after an initially pure synchronization operation entailing sending out the transmission frame without any data to be transferred, is also closed for data transfer starting with a transmission frame following synchronization and containing a transmission flag.

Figure 4:
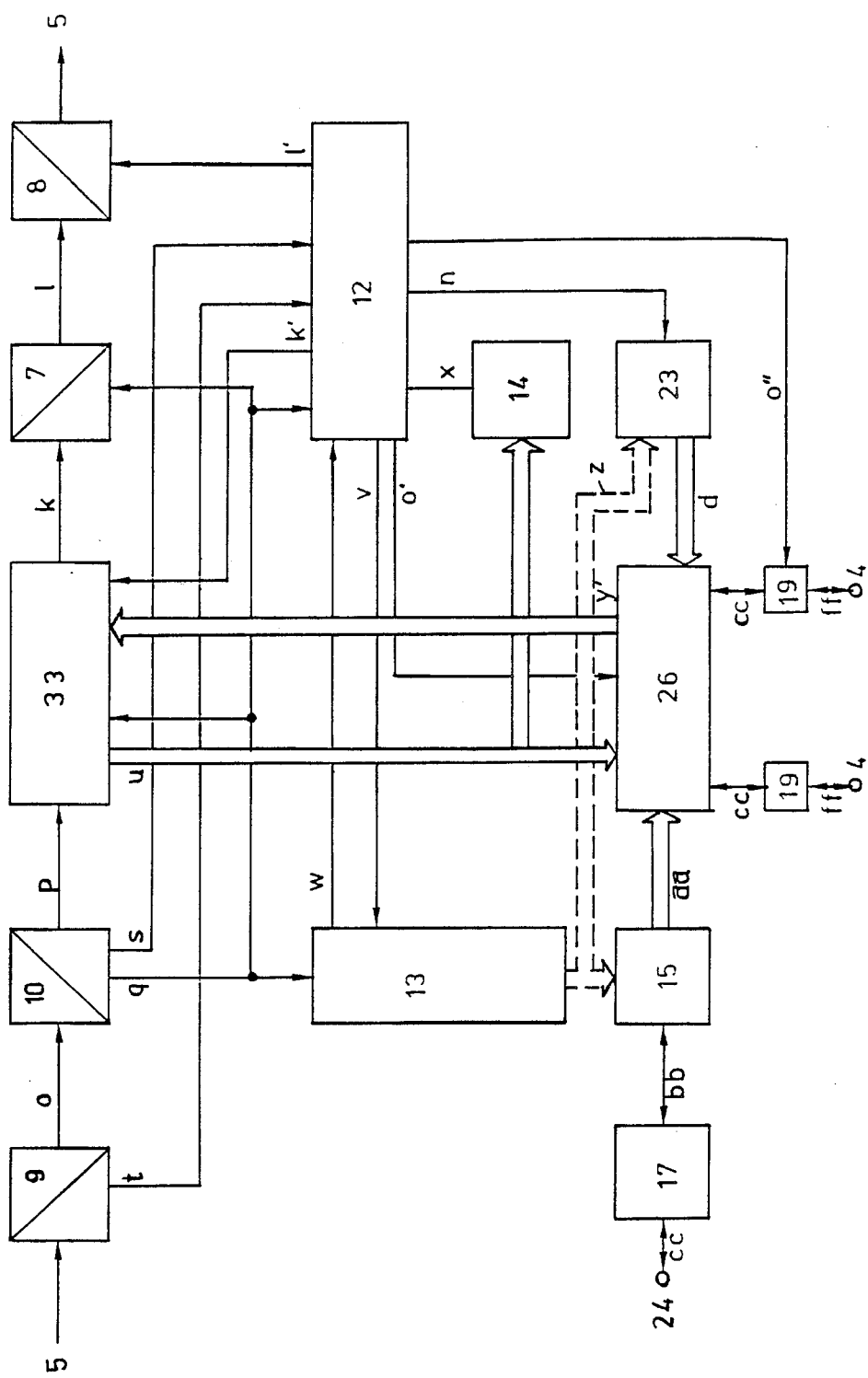
FIG. 4 shows a basic circuit diagram of a station.

FIG. 4 shows a block diagram of a station 1 in which structural elements of essentially identical function to those of the master station 3 and lines transferring essentially the same signals or the same information or outputs containing essentially the same signals are provided with identical reference numbers.

The transmission frame arriving in a station 1,2 . . . n is transferred via the medium interface or receiver 9 to the decoder device 10 and the data, after separating out the clock signal, are taken via the conductor p into a data exchange or shift register 33 which is clocked by the clock signal arriving via the conductor q.

When the information of an entire time slot 28 is in the data exchange unit or shift register 33, a transfer of the data via the conductor u and the buss y' can be effected by a control signal k of the error and control logic unit 12. the conductor u constantly displays the data information currently present in the data exchange unit or shift register 33. In the buss y' of one of the input-output devices or I/O controllers 26, the information newly to be transferred into the time slot 28 of the data exchange or communication unit or shift register 33 is displayed.

At the output k of the data communication unit or shift register 33, the data frame containing possibly modified information reappears in serial form and is transferred via the encoder 7 to the input device or transmission register 8 which in this case offers the additional possibility of inhibiting any output of the station 1,2 . . . n to the medium 5 by means of the signal l' in the event of system malfunction.

The error and control logic 12 receives via the conductor x a status signal from the transmission flag detector 14 which indicates whether a synchronization identifier or a transmission flag were detected in the arriving transmission frame. If a valid identifier is detected, a signal v for resetting of the frame format counter 13 is generated.

From now on, a transmission flag is always expected in the error and control logic unit 12 at the same time or clock cycle determined by a signal in the conductor w and the error and control logic unit 12 checks whether the transmission flag is detected in the transmission flag detector 14 at the time or clock cycle to be expected or the time or clock cycle determined by the signal in the conductor w.

If a synchronization identifier is detected, the synchronization process in the station 1,2 . . . n will start all over again.

If the synchronization flag is found to be in order or if the transmission flag status indicates "loop closed" which, a signal in the conductor o' sets "enable data transfer" in the I/O controller or input-output device 26, which permits initiation of data transfer.

In the event of an error arising in the station 1,2 . . . n itself, (missing clock signal, hardware error or the like), access to the medium 5 by the medium interface or transmission register 8 is prevented by the conductor l' of the medium interface 8.

In the event of non-receipt of a transmission frame, an "error frame" with an error identifier is generated via a signal in the conductor n in the flag generator 23 which receives the frame information and time slot data via the conductor z. The error identifier contains data concerning the failure or the station and is transmitted via the I/O controller or input-output device 26 and the buss y' or the data communication unit or shift register 33 to the medium 5 and via all the stations 1,2 . . . n to the master station 3.

Depending upon the enable signal in the conductor o' and the address signal in the buss aa of the routing unit 15, which indicates whether an I/O port 19 or which interface module or I/O port 19 is allocated for the actually arriving time slot 28 for data transfer, the available time slot data are transferred from the buss u to the port control logic or I/O controller 26 and presented by the latter via the conductor y' to the data communication unit or shift register 33 as output data with or without modification of the data by the port modules or I/O ports 19.

At initiation of operation, there is no reception in the station 1,2 . . . n. At this starting point, the frame format counter 13 runs freely, driven by an internal clock signal.

The error and control logic unit 12 detects via the conductor t that there is no reception at the medium interface or receiver 9 It blocks or inhibits via the conductor o' data transfer in the I/O controller or input-output device 26 and in the port modules or I/O ports 19 and enables via the conductor n the flag generator 23 to generate a data transmission frame with the aid of the clock signal of the frame format counter 13 on which the error identifier is impressed by the flag generator 23 and which is transmitted to the data communication unit or shift register 33 via the I/O controller input-output device 26, is encoded in the encoder 7 and transferred via the transmission register 8 to the medium 5, possibly repetitively.

As soon as the medium interface or receiver 9 detects clock signal data, these latter are separated by the decoder 10 into clock signals and data. The medium receiver 9 reports via the conductor t "reception" to the error and control logic unit 12. The data are now received in the data communication unit or shift register 33 after enabling via the conductor k'.

When the transmission flag detector or comparator 14 reports a synchronization identifier via the conductor x, the frame format counter 13 is reset via the conductor v.

From now on it is monitored whether a transmission flag is reported via the conductor x at the time of expectation of transmission flags indicated via the conductor w. If this is not the case, or if a cycle error is reported via the conductor s, all output of the station is blocked or inhibited via the conductor l'.

If, however, "loop synchronous" is detected via the conductor x in the timely arrived transmission flag, the I/O controller or input-output device 26 receives the message "data transfer enable" via the conductor o', whereupon data can be extracted or read from or input into the time slots 28 in the data communication unit or shift register 33, with the port modules or I/O ports 19 being allocated to the respective time slots 28 under control of the routing unit 15.

The routing unit 15 controls data transfer by means of time slots 28 allocated to the station 1,2 . . . n. If required, for instance if a connection is to be established, a request for allocation of one or more time slots 28 for this connection can be addressed to the routing unit 15 of the master station 3 by transmission of a corresponding request in the time slots 28 reserved for the routing system. A reply to the station 1,2 . . . n is transmitted via the medium 5 and an optional corresponding change in the number of time slots 28 allocated to the station 1,2 . . . n is made known to the routing unit 15.

The basic procedure is thus the following: For the synchronization of the station 1,2 . . . n or the frame format counter 13 with the transmitted frame, in the instant case, for instance, time slot 28 O with 10 bits is used. In this time slot 28, a particular bit pattern (synchronization identifier) is constantly transmitted. Each station compares an 8 bit length of this pattern with a reference bit pattern. If no coincidence occurs at the expected time, there is certainly an error in the transmission or in the station logic.

In this case, any further data transmission to the port modules or I/O ports 19 is blocked or inhibited. Resynchronization is also effected by using this particular time slot 28. This resynchronization following an error is controlled by the master station 3 which releases the frames for data transmission after resynchronization and continues to transmit resynchronization identifies until it receives one itself and thereupon transmits the "enable data transfer" flag or the transmission flag.

A connection is allocated one or more time slot(s) 28, in the case of a dedicated line permanently, otherwise temporarily. In the case of a dedicated line, the allocation of a channel of a station 1,2 . . . n to a time slot 28 can be effected via a not particularly shown PROM module locally in each station 1,2 . . . n (for instance, in order to define a dedicated line between station 1 interface number 16 and station 4 interface number 3, one time slot 28 (e.g. time slot 28 number 37) in station 1 must be allocated to interface number 16, while the same time slot 28 number 37 must be allocated to interface number 3 in station 4.)

In case of a temporary connection, this allocation is established by correlation of the local and central routing unit 15 by a not particularly shown relay center.

Inputting of the connection request can be done either manually via an inputting unit 20, via an intelligent interface port (protocol-controlled) or from the relay center.

The time required for establishing the connection strongly depends on the type of connection and the desired documentation and the validity check. In the simplest case, a point to point connection without documentation and checking requirements, the connection can be expected to be established within 4 to 10 ms.

The maximum transmission time for a 10 bit word (time slot 28) thus corresponds to the circulation time of a frame through the loop. Since the transmission time of the frame is always constant and about 1 ms, real time transmissions can be effected with a precision of about 100–200 ns. A constant transmission delay is required for closed loops.

The interfaces of the stations to the input and output devices are advantageously conventional standard interfaces.

By using an internal "intermediate standard" (ee), it is possible to convert the data format during transmission (for instance connection from a device with serial interface to a device with 8 bit parallel interface) without particular conversion hardware and software. This is only possible, however, if a protocol conversion is not also required.

Examples for standard interface modules:

V 24/RS232C ASYNC: up to 19,2 kbit/s
(8 bit data+2 control signals)
20 mA current loop: up to 9,6 kbit/s
(8 bit data+2 control signals)

Intelligent interface:

This module can serve up to four V 24/RS232C interfaces at 19,2 kbit/s, buffer the data and effect protocol handshaking. It can also be adapted to particular requirements (such as multiplexing of interfaces)

8 bit parallel I/O+two control signals

It is further possible to implement interfaces for IEEE488/IEC625 and interfaces for the transmission of analog signals and speech. In addition to this, it is possible, for instance, to establish a connection to other networks via an X.25 protocol interface unit. Moreover, when installing an additional interface in an already existing station 1, 2 . . . n, no interruption of operation for the other channels is to be expected.

Due to the spatial extent of the network, particular attention was paid to reliable and rapid error identification, location and documentation. Documentation and registration of errors and operational failures or malfunctions is effected centrally in the master station 3.

The following basic sources of errors are identified: Failure of optical conductors or optical and electrical components associated with the optical conductors, failure or malfunction of the station logic, errors in the transmission system, errors in the interface modules.

On errors in the transmission medium, such as optical conductors the subsequent station 1, 2 . . . n in the direction of transmission generates an error message to the master station 3.

On failure of a station 1, 2 . . . n due to failure of synchronization, the respective station 1, 2 . . . n is bridged or by-passed on a circuit level close to the transmission line. The missing absence of this station is detected and reported by regular polling of the transmission system.

Errors in the local part of the transmission system are detected by a watchdog circuit; the respective unit tries to transmit an error message to the master station 3.

Errors in the interface modules can, if intelligent modules are used, be reported and logged via the transmission system. In this case, it may also be possible to adopt measures for the elimination of the defective interface and to record diagnostic information.

Suitable transmission media are all known media such as cables (baseband, HF modulated, CATV), radio or optical transmission media, an optical medium being preferred.

The frame contains only one transmission flag with a synchronization character which also contains information concerning status in respect of synchronization and "loop complete". The synchronization operation is effected only once at the start of operation of the network and, if necessary, following a failure. During operation, synchronization is only monitored in each station 1, 2 . . . n-once at each circulation of the frame. Data transmission is only enabled when perfect loop synchronization is achieved. The transmission flag with a synchronization character controls channel allocation according to clock cycles in the time multiplexer. This has the effect that no load-dependent delay due to arbitration problems occurs and thus a constant transmission time between two stations 1, 2 ... n is assured. Since synchronization and data transmission are strictly separated as to time, user signals cannot disturb the synchronization. For this reason, it is possible to transmit different user protocols simultaneously on this LAN.

It is noted that the synchronization of the stations 1, 2 ... n and the master station 3 in respect of one another can also be carried out externally via separate lines. Synchronization by the circulating transmission frame is preferable, however. Further, there is no internal synchronzation of the stations 1, 2 ... n in relation to the signal just coming in or arriving, but instead a checking as to the timely arrival of an identifier contained in the information block or data packet.

Detection of the incoming or arriving identifiers and their checking is carried out in appropriate circuits, such as comparator circuits.

While there are shown and described present preferred embodiments of the invention, it is to be distinctly understood that the invention is not limited thereto, but may be otherwise variously embodied and practiced within the scope of the following claims.

Accordingly, we claim:

1. A method for transmitting data in a data loop having at least two successively arranged stations one of which is a master station, comprising the steps of:
   sequentially generating transmission frames in a master station at a predetermined, constant clock frequency;
   partitioning each one of said transmission frames into a predeterminate number of time slots of a predetermined duration;
   prior to entering data from said master station into a data loop containing said master station and at least one station successively arranged thereto, generating a synchronization identifier at said master station and occupying a preselected time slot by said synchronization identifier in a thus defined synchronization transmission frame;
   entering said synchronization transmission frame into said data loop and circulating said synchronization transmission frame from said master station successively through said at least one station and said data loop back to said master station in order to synchronize said master station and said at least one station;
   signalling synchronization of the at least one station to said master station and selectively repeating said step of circulating said synchronization transmission frame through said data loop until the at least one station is synchronized with said master station;
   generating a transmission flag and a synchronization flag at the master station and occupying, in a data transmission frame immediately following said synchronization transmission frame, a preselected time slot by said transmission flag, a preselected time slot by the synchronization flag and further time slots by data associated with said at least one station of said data loop;
   after establishing synchronization, entering said data transmission frame immediately sequentially to said synchronization transmission frame into said data loop and continuously circulating said data transmission frame successively through said at least one station of said data loop back to said master station;
   during said step of continuously circulating said data transmission frame through said at least one station, identifying said synchronization flag and said transmission flag at said at least one station and, after identification, substantially immediately and without intermediate storage communicating data between said at least one station and said data frame transmission time slots associated with said at least one station;
   selectively generating a transmission flag in said at least one station and entering said transmission flag conjointly with data to be transmitted from said at least one station into preselected time slots of said data transmission frame;
   said step of entering said data transmission frame into said data loop entailing entering said data transmission frame into said data loop for a predeterminate input time period;
   said step of continuously circulating said data transmission frame entailing circulating said data transmission frame through said data loop during a circulation period smaller than said input time period; and
   buffering said data of said continuously circulating data transmission frame on return to said master station prior to continuing said step of continuously circulating said data transmission frame.

2. The method as defined in claim 1, further including the steps of:
   providing at least one peripheral device at said at least two successively arranged stations; and
   said step of immediately communicating data between said at least one station and said associated time slots of said data transmission frame including data communication with said at least one peripheral device.

3. The method as defined in claim 2, wherein:
   said step of communicating data between said at least one station and said time slots associated with said at least one station entails extracting data from said associated time slot of said data transmission frame and
   transferring said extracted data to said at least one peripheral device.

4. The method as defined in claim 3, further including the step of:
   additionally to the step of extracting data from said time slot associated with said
   at least one station and transferring said extracted data to said at least one peripheral device, inputting data to be transmitted from said at least one peripheral device to an other one of said at least two successively arranged stations into the time slot of said data transmission frame associated with said other station.

5. The method as defined in claim 2, wherein:
   said step of communicating data between said at least one station and said time slots associated with said at least one station entails inputting data to be transmitted from said at least one peripheral device to an other one of said at least two successively arranged stations into the time slot of said data transmission frame associated with said other station.

6. The method as defined in claim 1, wherein:
said step of partitioning said transmission frames into said time slots entails partitioning said transmission frames into time slots of substantially equal duration.

7. The method as defined in claim 18, wherein:
said step of sequentially generating said transmission frames entails generating transmission frames which are devoid of protocol signals including address signals.

8. The method as defined in claim 1, wherein:
selecting as said preselected time slot occupied by said synchronization identifier, a first time slot located at the beginning of said synchronization transmission frame.

9. The method as defined in claim 1, further including the steps of:
detecting a transmission error in said data loop at one of said at least two successively arranged stations;
interrupting said step of continuously circulating said at least one data transmission frame through the data loop in response to detecting said transmission error;
generating at said one station at which said error was detected, an error transmission frame having a predetermined number of time slots and occupying at least one of said time slots by an error identifier;
entering said error transmission frame into said data loop and passing said error transmission frame through said at least one station in said date loop to said master station;
after receiving said error transmission frame at said master station, repeating said steps of generating and circulating said synchronization transmission frame; and
after re-synchronizing said one station, at which said error was detected, eliminating said interruption and continuing said step of continuously circulating said data transmission frame.

10. The method as defined in claim 9, wherein:
said step of detecting said transmission in said data loop at one of said at least two successively arranged stations includes selectively detecting as said transmission error, incorrect transmission of said data transmission frame, operational failure of said one station, omission of data, deficient transmission flag, incorrect occurrence of said transmission flag, deficient synchronization flag, incorrect occurrence of synchronization flag.

11. The method as defined in claim 9, further including the steps of:
providing at least one peripheral device at said at least two successively arranged stations;
said step of immediately communicating data between said at least one station and said associated time slots of said data transmission frame including data communication with said at least one peripheral device;
during said step of interrupting said step of continuously circulating said at least one data transmission frame, deferring transfer of said data from said one station to said at least one peripheral device;
receiving at said one station a next-following data transmission frame; and
after said step of identifying the transmission flag of said next following data transmission frame resuming said deferred transfer of said data from said one station to said at least one peripheral device.

12. The method as defined in claim 1, wherein:
said step of generating said transmission flag entails generating a transmission flag differing from said synchronization flag; and
said step of identifying said transmission flag and said synchronization flag at said at least one station entailing the steps of comparing the time of occurrence of the related time slots in relation to said synchronization transmission frame previously transmitted and a pattern of the transmission flag and the synchronization flag with related predetermined patterns.

13. The method as defined in claim 1, wherein:
said step of occupying said preselected time slot of said data transmission frame by said transmission flag entails selecting as said preselected time slot a time slot located in a starting section of said data transmission frame.

14. The method as defined in claim 13, wherein:
said step of selecting said preselected time slot entails selecting a first time slot located at the beginning of said data transmission frame.

15. The method as defined in claim 13, wherein:
said step of selecting said preselected time slot to be occupied by said transmission flag, entails selecting as said preselected time slot to be occupied by said transmission flag, a time slot corresponding to said preselected time slot occupied by said synchronization identifier in said synchronization transmission frame.

16. The method as defined in claim 1, wherein:
said step of occupying said preselected time slot of said data transmission frame entails selecting as said time slot, a time slot corresponding to said preselected time slot of said synchronization transmission frame.

17. An arrangement for transmitting data, comprising:
at least two successively arranged stations interconnected by a data transmission medium in a closed data loop;
said at least two successively arranged stations comprising a master station and at least one station;
said master station containing:
means for sequentially generating transmission frames partitioned into a predeterminate number of time slots of a predetermined duration;
a flag generator;
a transmitter device operatively connected to said transmission frame generating means, said flag generator and said data loop;
a central control unit operatively connecting said transmission frame generating means and said flag generator with said transmitter device;
a receiver device connected to said data loop;
synchronizing means connected to said receiver device;
an error and control logic circuit operatively connected with said synchronizing means, said receiver device and said central control unit;
a routing unit connected to said synchronizing means;
an input-output device operatively connected with said receiver device, said error and logic control circuit and said routing unit;
a buffer storage device operatively interconnected between said input-output device and said transmitter device and connected with said synchronizing means and said error and control logic circuit;

said at least one station containing:

a transmitter device connected to said data loop;

a receiver device connected to said data loop;

synchronizing means connected to said receiver device;

an error and control logic circuit operatively connected with said synchronizing means and said receiver device;

a routing unit connected to said synchronizing means;

a flag generator operatively connected with said synchronizing means;

an input-output device operatively connected with said receiver device, said error and control logic circuit and said routing unit as well as said transmitter device and said flag generator;

each one of said at least two successively arranged stations containing at least one peripheral device connected to said input-output device;

said flag generator of said master station, prior to entering data into said data loop, generating a synchronization identifier and said transmitter device entering into said data loop a synchronization transmission frame which is circulated through said data loop and returned to said master station, in order to thereby synchronize said at least one station and said master station by said synchronizing means and generate a synchronization signal;

said central control unit of said master station, upon receiving said synchronization signal, controlling said flag generator, said buffer storage means and said transmitter device such that, immediately following said synchronization transmission frame, there is entered into said data loop a data transmission frame containing in preselected time slots a synchronization flag, a transmission flag and data associated with respective ones of said at least two successively arranged stations, for circulation through said data loop and return to said master station;

said at least one station, upon receiving and identifying said synchronization flag and said transmission flag by said synchronizing means, being controlled to selectively either transfer data from associated time slots of said data transmission frame to said at least one peripheral device or input data to be transmitted from said at least one peripheral device conjointly with a transmission flag generated by the associated flag generator into a predetermined time slot of said data transmission without the interposition of any storage means;

said transmitter device of said master station entering into said data transmission medium an immediate succession of said transmission frames which are devoid of any protocol signals including address signals; and each one of said routing units associating predetermined time slots of said data transmission frame to respective ones of said at least two successively arranged stations.

18. The arrangement as defined in claim 17, wherein: said data transmission medium is selected from the group consisting of a cable, transmitting installation, an optical conductor, and an electrolyte.

19. The arrangement as defined in claim 17, wherein: said means for sequentially generating transmission frames at said master station contain:

a format frame counter connected to said central control unit, said flag generator and said buffer storage means;

a continually operating clock signal generator connected to said central control unit, said format frame counter and said transmitter device;

said frame counter partitioning said transmission frames into said predeterminate number of time slots; and said central control unit activating said flag generator upon receiving said synchronization signal.

20. The arrangement as defined in claim 17, wherein: said master station contains a data read unit operatively connecting said buffer storage means and said transmitter device;

said continually operating clock signal generator being connected with said data read unit;

a control logic unit connected to said central control unit and said flag generator; and said control logic unit operatively interconnecting said buffer storage means and said data read unit.

21. The arrangement as defined in claim 20, wherein: said data read unit comprises a shift register.

22. The arrangement as defined in claim 17, wherein: said transmitter device in each one of the said at least two successively arranged stations produces transmission frames containing clock-signal encoded data;

said receiver device at each one of said at least two successively arranged stations receiving said transmission frames containing said clock-signal encoded data;

said receiver device in each one of said at least two successively arranged stations comprising a decoding device for separating a clock signal from data contained in said received clock signal encoded data;

said synchronizing means of each one of said at least two successively arranged stations containing a frame format counter connected to said decoder and said error and control logic circuit, and a flag detector connected to said error and control logic circuit and said frame format counter;

a data transfer unit operatively interconnecting said decoder and said input-output device, and receiving said data from said decoder;

said receiver device being operatively connected to said frame format counter, said error and control logic circuit and said data transfer unit;

said flag detector cooperating with said frame format counter for detecting a coincidence of said transmission flag and said synchronization flag in said received data with a predetermined pattern and their occurrence in predeterminate time slots of said received data transmission frame; and said error and control logic circuit upon said coincidence of patterns and occurrence in predeterminate time slots of said synchronization flag and said transmission flag, activating said input-output device.

23. The arrangement as defined in claim 1, wherein: said data transfer unit comprises a data extraction unit.

24. The arrangement as defined in claim 1, wherein: said data transfer unit comprises a data exchange unit.

25. The arrangement as defined in claim 22, further including:
   a port module interconnected between said input-output device and said at least one peripheral device in each one of said at least two successively arranged stations.

26. The arrangement as defined in claim 1, wherein:
   said frame format counter in each one of said at least two successively arranged stations is reset by said synchronization identifier associated with said synchronization transmission frame; and
   said frame format counter being also reset by said synchronization flag of associated with said received data transmission frame and predetermining the time of occurrence of the synchronization flag of a next-following data transmission frame.

27. The arrangement as defined in claim 22, wherein:
   said frame format counter of each one of said at least two successively arranged stations indicating a respective associated time slot of said received data transmission frame to said associated routing unit.

28. The arrangement as defined in claim 27, further including:
   a routing control unit; and
   said routing unit being connected to said routing control unit for determining time slots associated with respective predeterminate stations of said at least two successively arranged stations for inputting data for such respective predeterminate stations from said input-output device associated with said routing unit.

29. The arrangement as defined in claim 27, further including:
   a routing control unit; and
   said routing unit being connected to said routing control unit for determining time slots associated with predeterminate ones of said at least one peripheral devices connected with said routing unit.

30. The arrangement as defined in claim 17, further including:
   a blocking signal generator contained in said error and control logic circuit of said at least one station;
   said blocking signal generator being connected to said transmitter device and generating a blocking signal upon the occurrence of an error in said receiver device and/or said synchronizing means; and
   said blocking signal generator, by means of said blocking signal, blocking said transmitter device.

31. The arrangement as defined in claim 30, wherein:
   said frame format counter in each one of said at least two successively arranged stations, upon the occurrence of said error, generating an error transmission frame for transmission by the associated transmitter device; and
   said error transmission frame containing an error identifier and a transmission flag generated by the associated flag generator.

* * * * *

UNITED STATES PATENT AND TRADEMARK OFFICE
CERTIFICATE OF CORRECTION

PATENT NO. : 4,769,839

DATED : September 6, 1988

INVENTOR(S) : HANS PREINEDER et al

It is certified that error appears in the above-identified patent and that said Letters Patent is hereby corrected as shown below:

Title Page, Assignee, please delete "Ostereichisehes" and insert --Oesterreichisches--

Column 3, line 49, please delete "transitter" and insert --transmitter--

Column 4, line 15, please delete "analogus" and insert --analogous--

Column 4, line 17, please delete "tranfer" and insert --transfer--

Column 4, line 37, please delete "station" and insert --stations--

Column 4, line 38, after "a" please insert --data--

Column 4, line 48, please delete "(I/O" and insert --I/O--

Column 5, line 26, after "loop" please insert --or--

Column 5, line 27, please delete "release"

Column 5, line 28, please delete "in" and insert --to the--

Column 6, line 2, please delete "15"

Column 6, line 4, please delete "1,2...mn" and insert --1,2...n--

Column 6, line 60, please delete "shaft" and insert --shift--

Column 6, line 68, please delete "k" and after "conductor" please insert --k--

UNITED STATES PATENT AND TRADEMARK OFFICE
CERTIFICATE OF CORRECTION

PATENT NO. : 4,769,839

DATED : September 6, 1988

INVENTOR(S) : HANS PREINEDER et al

It is certified that error appears in the above-identified patent and that said Letters Patent is hereby corrected as shown below:

Column 7, line 2, please delete "k" and after "conductor" please insert --k--

Column 7, line 3, after "via" please delete "a to" and after "conductor" please insert --a to--

Column 7, line 16, please delete "the" (both occurrences)

Column 7, line 23, please delete "q" and after "conductor" please insert --q--

Column 7, line 43, after "conductor" please delete "y" and insert --x--

Column 7, line 53, after "start" please insert --of--

Column 7, line 54, after "transmission" please delete "of"

Column 7, line 61, please delete "cycle" and insert --clock signal--

Column 8, line 15, please delete "on" and insert --or--

Column 9, line 61, after "then" please insert --arrives--

Column 9, line 66, please delete "q" and after "conductor" please insert --q--

Column 10, line 53, please delete "13" and insert --18--

Column 11, line 2, after "and" please delete "," (comma)

Column 11, line 3, please delete "the port" and after "again" please insert --, the port--

UNITED STATES PATENT AND TRADEMARK OFFICE
CERTIFICATE OF CORRECTION

PATENT NO.  : 4,769,839
DATED       : September 6, 1988
INVENTOR(S) : HANS PREINEDER et al It is certified that error appears in the above-identified patent and that said Letters Patent is hereby corrected as shown below:

Column 11, line 29, please delete "the" and insert --The--
Column 11, line 53, after "w" please insert --.-- (period)
Column 11, line 54, please delete "and the" and insert --The--
Column 11, line 63, after "closed"" please insert --,-- (comma)
Column 11, line 64, please delete "which,"
Column 13, line 2, before "time" please insert --the--
Column 13, line 28, please delete "identifies" and insert --identifiers--
Column 14, line 35, please delete "condunctors" and insert --conductors--
Column 14, line 46, please delete "missing"
Column 17, line 6, please delete "18" and insert --1--
Column 17, line 30, please delete "date" and insert --data--
Column 20, line 64, please delete "1" and insert --22--
Column 20, line 67, please delete "1" and insert --22--

UNITED STATES PATENT AND TRADEMARK OFFICE
CERTIFICATE OF CORRECTION

PATENT NO. : 4,769,839

DATED : September 6, 1988

INVENTOR(S) : HANS PREINEDER et al.

It is certified that error appears in the above-identified patent and that said Letters Patent is hereby corrected as shown below:

column 21, line 7, please delete "1" and insert -- 22 --.

Signed and Sealed this

Twenty-fifth Day of April, 1989

Attest:

DONALD J. QUIGG

*Attesting Officer*  *Commissioner of Patents and Trademarks*